Dec. 15, 1936.     J. P. GRIGGS     2,064,793
FABRIC CENTERING APPARATUS
Filed May 25, 1932     2 Sheets-Sheet 1
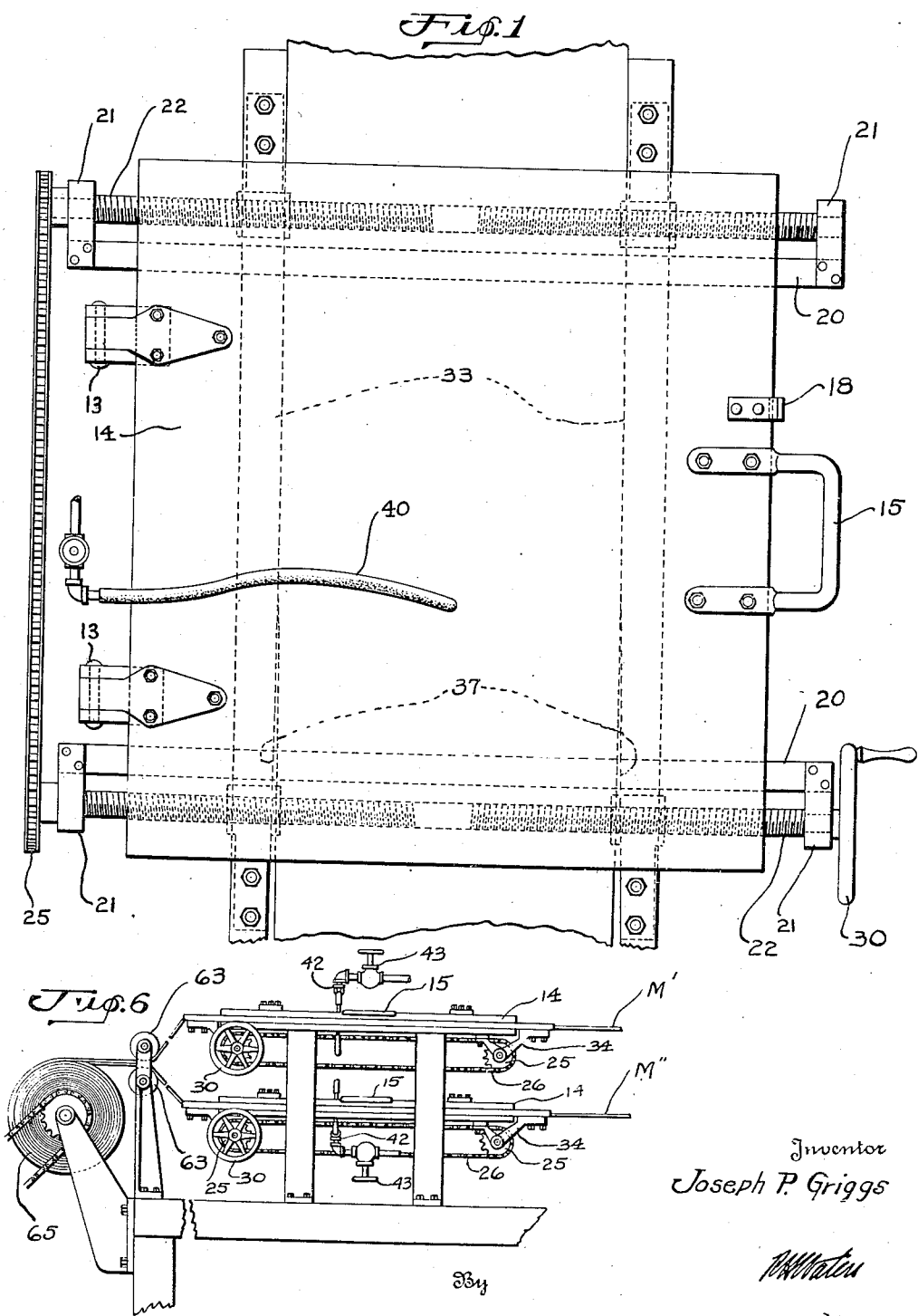
Inventor
Joseph P. Griggs

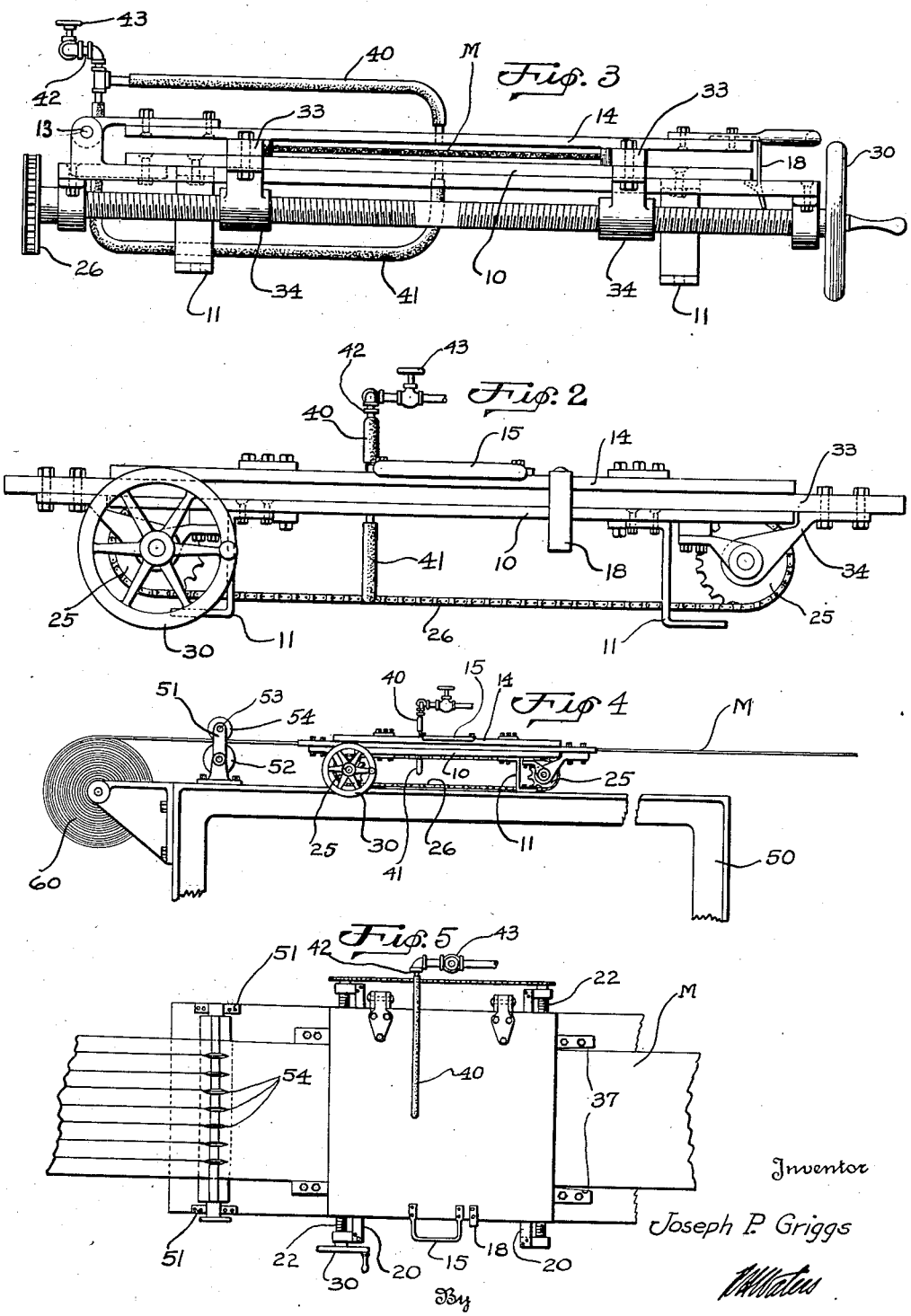
Dec. 15, 1936.  J. P. GRIGGS  2,064,793
FABRIC CENTERING APPARATUS
Filed May 25, 1932  2 Sheets-Sheet 2
Inventor
Joseph P. Griggs Patented Dec. 15, 1936

2,064,793

UNITED STATES PATENT OFFICE 2,064,793

FABRIC CENTERING APPARATUS

Joseph P. Griggs, Akron, Ohio, assignor to Wingfoot Corporation, Wilmington, Del., a corporation of Delaware Application May 25, 1932, Serial No. 613,575

4 Claims. (Cl. 271—2.6)

This invention relates to a fabric or stock centering device, more particularly adapted to be used in conjunction with wide flat web material in order to properly center the material so that it can be evenly rolled, or for other similar purposes.

Heretofore, a number of mechanisms have been provided for centering fabric stock in order that it can be evenly rolled or cut. However, such prior mechanisms have included a number of disadvantages; they are either too elaborate and expensive to build and use in large numbers; or they are too delicate to properly keep in adjustment over long periods of wear. It has also been found that, even with apparatus designed for this purpose, the fabric will work off center with a resultant irregular positioning thereof.

Another undesirable feature of prior constructions was that they offered too much resistance to the passage of the fabric. In certain cases this caused no trouble, however, in others it resulted in a very undesirable stretching of the fabric as it was passed through the centering device. This feature is presented in the centering of rubberized fabric, particularly where such fabric is cut on the bias.

It is an object of the invention to provide a ply centering device that is designed to overcome and avoid the undesirable features of prior constructions, and in which the mechanism will function to automatically center the ply over long periods of use with little or no attention.

Another object of the invention is to provide a fabric aligning apparatus which is simple and inexpensive and which will serve to properly align the material passing therethrough while offering little or no resistance to the passage thereof.

Another object of the invention is to provide mechanism for centering the webbed material, wherein the material is floated upon air while it is being centered.

Another object of the invention is to provide an apparatus for aligning flexible sheet material which is adapted to be used with material of various widths.

Another object of the invention is the provision of a device of the class described, wherein the material to be centered can be readily threaded into the device.

The above and other objects of the invention are achieved by the mechanism described hereafter and illustrated in the accompanying drawings, wherein:

Fig. 1 is a plan view of one embodiment of the apparatus comprising the invention;

Fig. 2 is a side elevation of the apparatus illustrated in Fig. 1;

Fig. 3 is an end view of the apparatus illustrated in Fig. 1;

Fig. 4 is a side elevation showing an application of the centering mechanism to a ply slitting and rolling device;

Fig. 5 is a partial plan view of the mechanism illustrated in Fig. 4; and

Fig. 6 is a side elevation of another application of the ply centering mechanism.

The apparatus comprises a back plate 10 which may be mounted upon any suitable support by brackets 11. Hinged to the back plate 10, as at 13, is a front plate 14 having a handle 15 by which it may be swung towards and away from the back plate 10. In order to lock the two plates together a simple latch 18, of any suitable construction, can be employed.

Secured to the back of the plate 10 are a pair of bars 20 to the ends of which are fastened bearings 21 which serve to journal screws 22 at their ends. At one side of the apparatus the screws 22 are extended through the bearings 21 and carry sprockets 25 over which pass a chain 26. One of the screws 22 also is extended through the bearing at its other end and a hand wheel 30 is secured thereon.

Slidably mounted between the back plate 10 and the front plate 14 are a pair of spaced guide bars 33, having brackets 34 secured to their ends, which brackets are internally threaded to cooperate with the threaded portions of the screws 22. It will be understood that the screws 22 have the opposite ends thereof threaded in opposite directions so that rotation of the screws will serve to move the bars 33 towards and away from each other. As indicated in Fig. 1 the guide bars 33 are formed with a slight taper as at 37. This assists in aligning any material such as that shown at M which is to be centered in its passage through the apparatus.

A very important feature of the machine is the provision of air cushions or means for air floating of the material M in its passage through the apparatus. In the embodiment of the invention illustrated this is accomplished by providing conduits 40 and 41 which extend through the front plate 14 and back plate 10 respectively and which are connected by a conduit 42 provided with valve 43 to a suitable supply of compressed air or similar fluid.

It will be understood that the fabric centering mechanism can be employed wherever it is desirable to center or align web or sheet material of substantially any characteristics. Figs. 4 and 5 of the drawings illustrate the application of the mechanism to a rubber fabric slitting machine. This machine comprises a table portion 50 to which is secured a pair of brackets 51 which serve to journal a rubber roll 52 and also a shaft 53, upon which is fixed a plurality of spaced slitting discs 54.

The fabric or stock to be centered, again indicated at M, is passed, as is illustrated, through the centering mechanism, from which it passes over the rubber roll 52, at which time the slitting discs 54 slit the material M into a plurality of strips; the material M is then rolled up with or without an accompanying liner as indicated at 60.

Fig. 6 illustrates the centering mechanism adapted to positively align two or more strips of material M' and M'' with respect to each other. In this operation the centering mechanisms are placed one above the other upon a suitable framework. The strips M' and M'' may be forced together with rollers 63 and wound up on a roll 65 with or without a liner. In employing the centering mechanism for this fabric aligning and joining operation it is contemplated building two or more of the units together and having one back plate serve for two units, the hinged plates swinging away on opposite sides thereof.

It is believed that the operation of the apparatus will be entirely clear from the foregoing detailed description. However, a brief resumé thereof follows:

The material M is first threaded through the aligning apparatus and in this operation the latch 18 is unfastened and the front plate 14 is swung open by the use of the handle 15, whereupon the material M can be readily placed between the guide bars 33. The hand wheel 30 is turned until the guide bars 33 at their upper or narrowest ends are substantially the width of the material to be aligned. The front plate 14 is then swung back into position and the latch 18 is fastened. The valve 43 is now open to supply a steady current of air to both sides of the material M. It will be understood that there will be a continuous leakage of air around the points where the material M enters and leaves the apparatus. This leakage of air may be reduced if found desirable by partialily narrowing the height of the openings between the plates at these points. Again the exact amount of air passed through the apparatus will serve to control this leakage. It will be seen that the volume of air passed to the mechanism can be readily adjusted by means of the valve 43 so that the exact cushioning action thereof can be varied and controlled as desired. The air cushion which serves to support the material M throughout the apparatus allows it to be moved from one side to the other very easily so that the taper 37 of the guide bars 33 serves to exactly align or center the material M as it leaves the apparatus.

In employing the mechanism comprising the present invention, it will be understood that the mechanism can be used either in the horizontal, vertical, or any other position, with very desirable results. However, it is preferably used in the vertical position. The centering apparatus is readily adaptable to use with sheet or web material of all types and sizes which may or may not be inherently stretchable. The apparatus is particularly adapted for use with stretchable material because it offers little or no resistance to the passage of the material therethrough.

The apparatus may be employed in conjunction with any machinery where it is desired to center or align the web material for any purpose. It can be employed upon wind-up mechanisms where the centering apparatus will merely serve to insure the wind-up of a smooth ended roll. Again it can be employed with cutting or wrapping apparatus, wherein its aligning features will insure the positive positioning of the web material for such cutting or wrapping operations.

Although I have illustrated the preferred forms which the invention may assume and have described those forms in detail, it will be apparent to those skilled in the art that the invention is not so limited but that various modifications may be made therein without departing from the spirit of the invention or from the scope of the appended claims.

What I claim is:

1. In apparatus of the class described, a pair of relatively spaced normally parallel plates defining between them a straight passageway for a travelling web material, a pair of guide bars disposed between the plates and forming side limits of said passageway, and mechanism for accurately adjusting the guide bars toward and from each other, and supporting means permitting movement of one of said plates with reference to the other whereby to completely uncover said passageway and guide bars.

2. In apparatus of the class described, a pair of relatively spaced normally parallel plates defining between them a straight passageway for a travelling web material, a pair of guide bars disposed between the plates and forming side limits of said passageway, and mechanism including screws for simultaneously adjusting said guide bars toward and from each other while maintaining them in substantially parallel relation, and hinge-supporting means for one of the plates permitting it to be swung away from the other plate and thereby to completely uncover the passageway between the guide bars.

3. In combination with means for assembling two separately supplied strips of web material in superimposed relation, a pair of guiding units having pneumatic means for floating the respective strips during their travel thru the units, each of said units having means for guiding the edges of the strips into a predetermined assembly relationship, and means for adjusting the guiding means of said units to accommodate web materials of different widths.

4. In combination, means for assembling two separately supplied strips of web material in superimposed relation, and a pair of guiding units having pneumatic means for floating the respective strips during their travel thru the units, each of said units having means for guiding the edges of the strips into a predetermined assembly relation.

JOSEPH P. GRIGGS.